United States Patent

[11] 3,583,550

| [72] | Inventor | Bayard G. Gardiner, Jr. |
| --- | --- | --- |
| | | Patterson, N.Y. |
| [21] | Appl. No. | 807,577 |
| [22] | Filed | Mar. 17, 1969 |
| [45] | Patented | June 8, 1971 |
| [73] | Assignee | Guenther Systems, Inc. |
| | | Buchanan, N.Y. |

[54] DRIVE CHAIN
11 Claims, 6 Drawing Figs.

[52] U.S. Cl. .................................................. 198/154,
74/216.5
[51] Int. Cl. ..................................................B65g 15/52,
F16h 7/06
[50] Field of Search ........................................... 198/153,
154, 203; 74/216.5, 221

[56] References Cited
UNITED STATES PATENTS
2,530,786  11/1950  Rose .............................. 74/221
3,223,260  12/1965  Bright ............................ 198/153

FOREIGN PATENTS
870,724  3/1942  France ......................... 74/26.5

Primary Examiner—Edward A. Sroka
Attorney—Brumbaugh, Graves, Donohue & Raymond

ABSTRACT: In the illustrative embodiments of the invention described herein, a drive chain comprises at least two chains arranged in superposed interlocking relationship. Each chain comprises a succession of links with the overlapping portions of adjacent links connected together by pin members. The links of each chain further include bearing surfaces and when the two chains are arranged in interlocking relationship, the overlapping portions of the links in one chain engage the bearing surfaces of the links composing the other chain. To drive or guide the drive chain, a sprocket having a pitch equal to one-half the distance between the overlapping portions of adjacent links is provided.

PATENTED JUN 8 1971

INVENTOR.
BAYARD G. GARDINEER, JR.

BY
Brumbaugh, Graves, Donohue & Raymond his ATTORNEYS

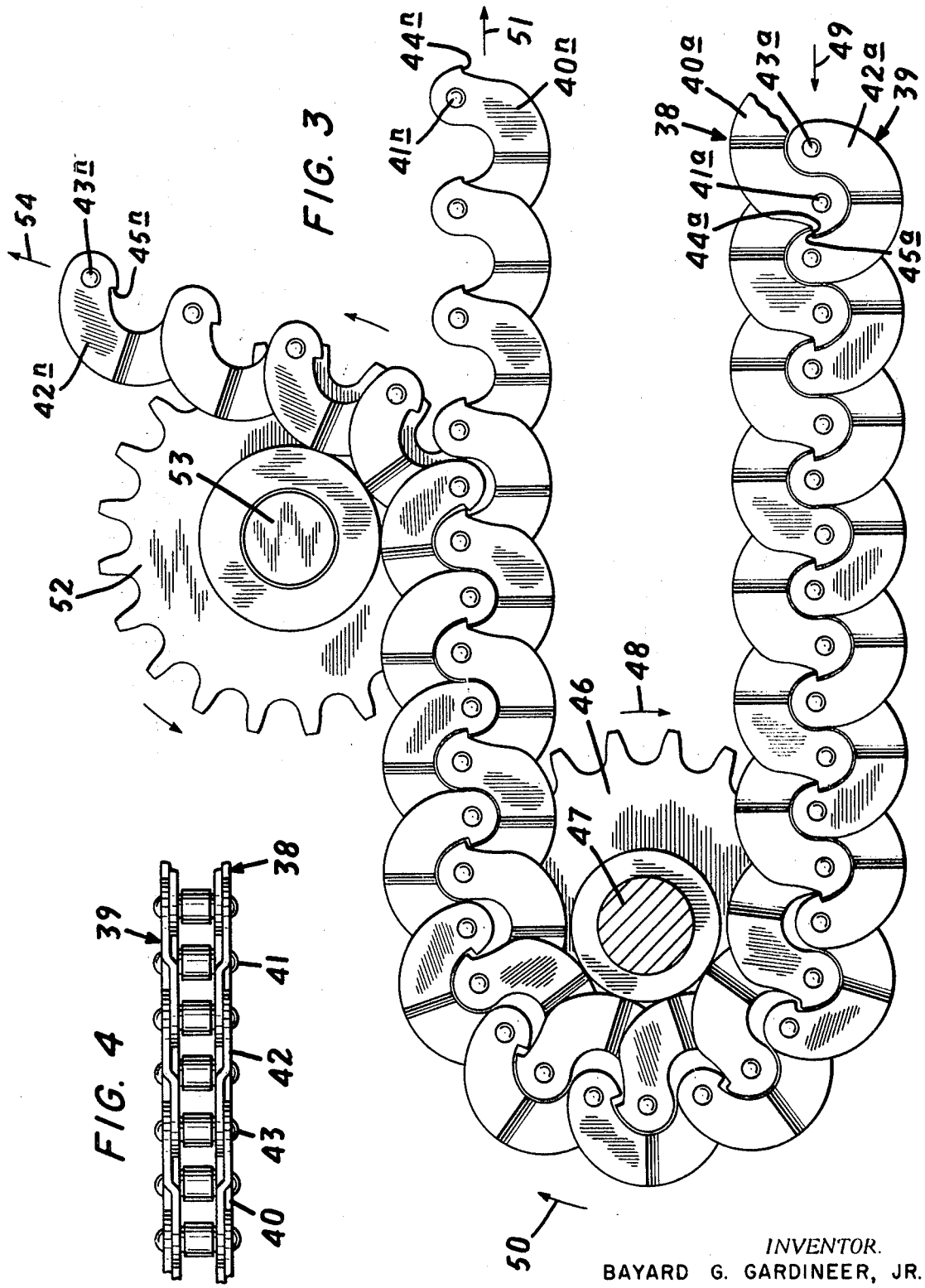

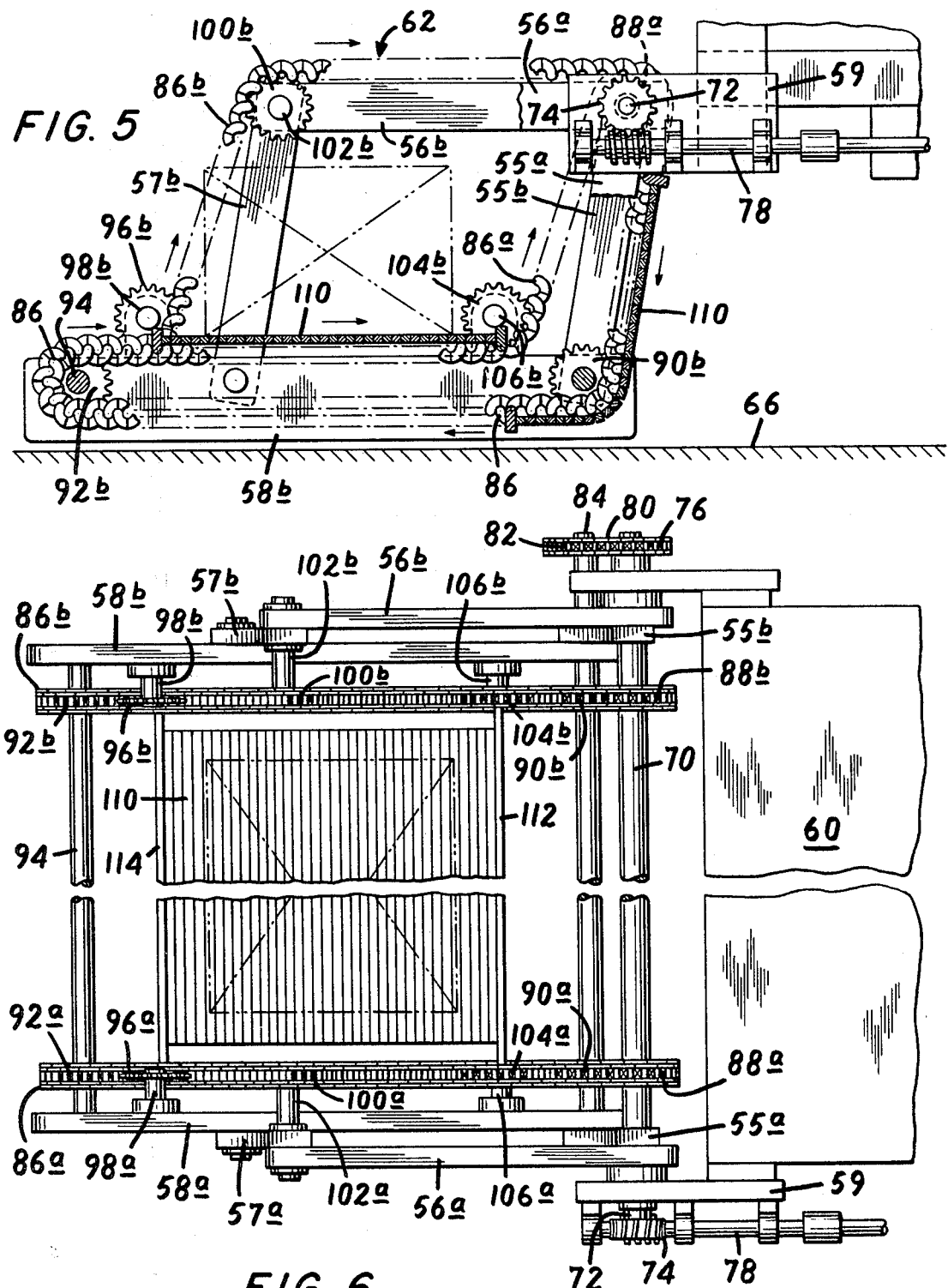

3,583,550

DRIVE CHAIN

BACKGROUND OF THE INVENTION

This invention relates to chain drive systems, and more particularly, to a new and improved drive chain for transport and the like devices.

In a copending application entitled "Transport Device," Ser. No. 798,366, filed Feb. 11, 1969 and assigned to the assignee of the present application, there is described an adjustable transport device which includes a chain drive system comprising a multiplicity of offset endless chain pairs for transporting unit loads of material between a number of vertically and laterally displaced locations. To both drive and guide the chain pairs in their movement a corresponding plurality of sets of drive and guide members, for example, sprockets are located at selective locations in the transport device.

Generally, it may be noted that in all prior art devices including chain drive systems each chain or chain pair has exclusively associated therewith guide and drive members. Accordingly, space and hardware limitations quite often limit the number of drive chains or drive chain pairs that can be employed. In addition, the load carrying capabilities of such chain drive systems are limited. Generally, the load is carried by the pin members of the chains which connect the links of the chains together and to adjacent links. These pins have only limited shear strengths and care must be taken to limit the weight of the loads to avoid shearing the pins.

SUMMARY OF THE INVENTION

It is therefore an object of the present invention to provide a unique and novel drive chain which overcomes the above-mentioned disadvantages of the prior art.

It is also an object of the present invention to provide a drive chain comprising a plurality of chains which are adapted to move in the same plane and over the same guide and drive members.

It is a further object of the present invention to provide a drive chain which provides improved load carrying capabilities.

These and other objects are accomplished by the drive chain of the present invention. The drive chain comprises at least two chains arranged in interlocking relationship. Each chain comprises a succession of links with the overlapping portions of adjacent links connected together by coupling members. The links of each chain further include bearing surfaces and when the two chains are arranged in interlocking relationship, the overlapping portions of the links in one chain engage the bearing surfaces of the links composing the other chain.

In one preferred embodiment of the invention, each chain comprises alternately arranged inner and outer generally arch-shaped links. In another preferred embodiment of the invention, each chain comprises a succession of offset arch-shaped links with notches formed in the outside flanges of the links. To drive either of the above described drive chains, a sprocket or similar drive member having a pitch equal to one-half the distance between the overlapping portions of adjacent links is provided.

BRIEF DESCRIPTION OF THE DRAWING

In the Drawings:

FIG. 3 is a perspective view of another embodiment of a typical drive chain arranged according to the present invention;

FIG. 4 is a top plan view of the typical drive chain illustrated in FIG. 3;

FIG. 5 is a side elevational view, partly broken away, of a transport device attachment for trucks including the drive chain of the present invention as illustrated in FIG. 3; and FIG. 6 is a top plan view of the transport device attachment for trucks as illustrated in FIG. 5.

DESCRIPTION OF THE PREFERRED EMBODIMENT

Figure 1:
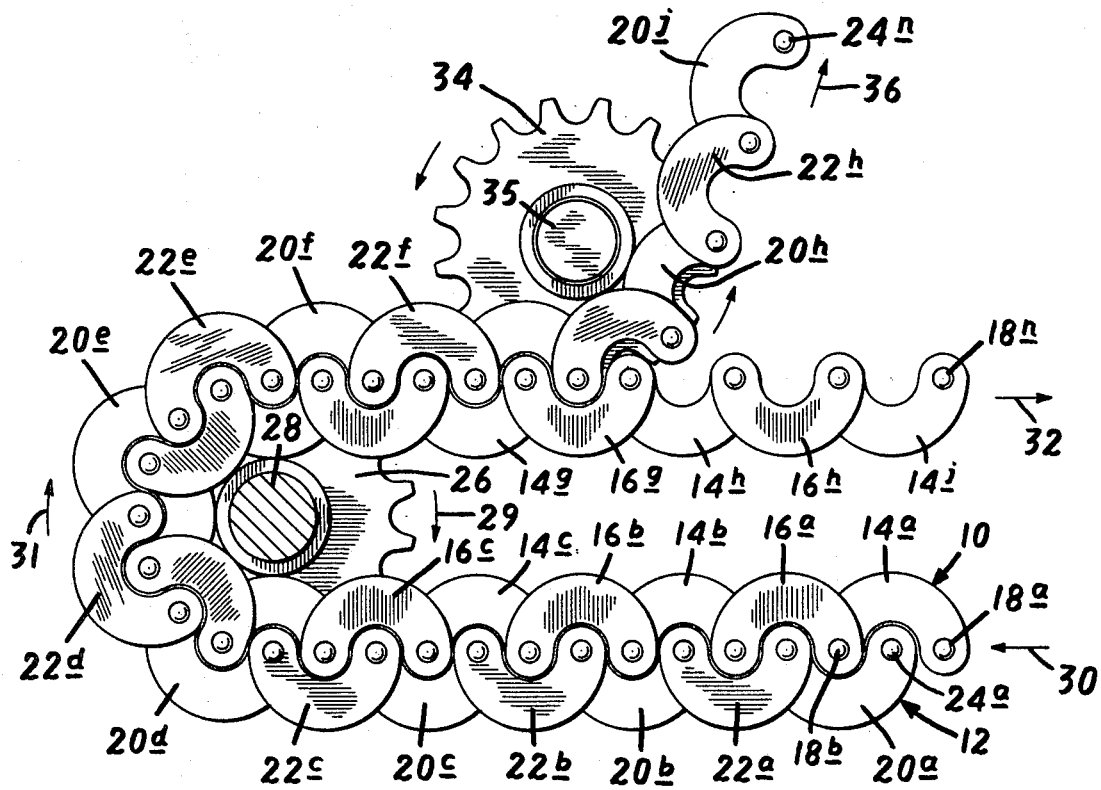
FIG. 1 is a perspective view of one embodiment of a typical drive chain arranged according to the present invention.
Figure 2:
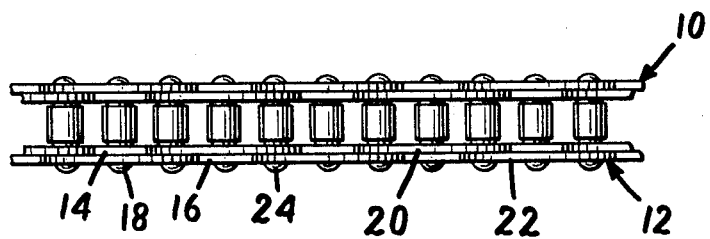
FIG. 2 is a top plan view of the typical drive chain illustrated in FIG. 1.

In one embodiment of a typical drive chain arranged according to the present invention, as shown in FIGS. 1 and 2, a pair of chains 10 and 12 are arranged in superposed interlocking relationship. The chain 10 comprises alternately arranged inner and outer generally arch-shaped links 14a—14j and 16a—16h, respectively. A plurality of pin members 18a—18n secure the individual links of the chain 10 together, as well as secure the overlapping flanges of adjacent inner and outer links together.

Similarly, the chain 12 comprises alternately arranged inner and outer generally arch-shaped links 20a—20j and 22a—22j, respectively, of substantially the same size as the inner and outer links 14a—14j and 16a—16h, respectively, composing the chain 10. The individual links, as well as the overlapping flanges of adjacent inner and outer links 20a—20j and 22a—22h of the chain 12 are secured together by a plurality of pin members 24a—24n. As shown in FIG. 1, when the chains 10 and 12 are arranged in superposed interlocking relationship, the overlapping flanges of the inner and outer links 14a—14j and 16a—16h, respectively, of the chain 10 engage the bearing surfaces of the inner and outer links 20a—20j and 22a—22 of the chain 12. Similarly, the bearing surfaces of the links 14a—14j and 16a—16h of the chain 10 are engaged by the overlapping flanges of the inner and outer links 20a—20j and 22a—22h of the chain 12.

To drive the interlocked chains 10 and 12, a sprocket 26 mounted on a drive shaft 28 is provided. As shown, the sprocket 26 comprises peripheral teeth having a pitch equal to one-half the distance between the overlapping flanges of adjacent links in the chains 10 and 12 and, accordingly, both chains are engaged by the sprocket. As viewed in FIG. 1, for a clockwise movement of the sprocket 26, as indicated by the arrow 29, the interlocked chains will be driven to the left, around the sprocket 26 and then to the right as indicated by arrows 30, 31 and 32, respectively.

After passing around the sprocket 26, the drive chain is driven to the right across a second sprocket 34 mounted on a drive shaft 35 and having peripheral teeth which engage the links of the chains 10 and 12 to guide the chains 10 and 12 in the direction indicated by the arrow 32. At this junction, the chains 10 and 12 will separate, the chain 12 being driven upwardly in the direction indicated by the arrow 36 to a sprocket, for example, and the chain 10 being driven to the right in the direction indicated by the arrow 32 to another sprocket, for example. After being driven in different directions, the chains 10 and 12 are thereafter brought together in interlocking relationship, as will be readily apparent when the transport device illustrated in FIGS. 5 and 6 is described.

In another embodiment of a typical drive chain arranged according to the present invention, as shown in FIGS. 3 and 4, a pair of chains 38 and 39 are arranged in superposed interlocking relationship. The chain 38 comprises a succession of generally arch-shaped offset links 40a—40n which are secured together and to the overlapping flanges of adjacent links by a plurality of pin members 41a—41n. Similarly, the chain 39 comprises successive generally arch-shaped offset links 42a—42n, each link being coupled together and to an adjacent link by a plurality of pin members 43a—43n.

As best shown in FIG. 3, the outwardly disposed flanges of the links 40a—40n and 42a—42n of the chains 38 and 39 are notched at points 44a—44n and 45a—45n, respectively. In this manner, when the chains 38 and 39 are arranged in superposed interlocking relation with the overlapping flanges of each chain engaging the bearing surfaces of the links composing the other chain, the outwardly disposed flanges of the links composing the chains 38 and 39 engage in a locking relationship. Through this arrangement, the drive chain possesses an increased load carrying capacity in that the overlapping flanges interact under stress to carry the load from link to link instead of carrying the load from the link to the coupling pins 41a—41 and 43a—43n.

To drive the drive chain, a sprocket 46 mounted on a drive shaft 47 is provided. The sprocket 46 comprises peripheral teeth having a pitch equal to one-half the distance between the overlapping flanges of adjacent links in the chains 38 and 39 and both chains are therefore engaged by the teeth of the sprocket 46. As viewed in FIG. 3, for a clockwise rotation by the sprocket 46, as indicated by the arrow 48, the interlocked chains will be driven to the left, around the sprocket 46 and then to the right as indicated by the arrows 49, 50 and 51, respectively.

After passing around the sprocket 46, the drive chain is driven to the right across a second sprocket 52 mounted on a drive shaft 53 and having peripheral teeth which the links of the chains 38 and 39 engage to guide the chains in the direction indicated by the arrow 51. At this juncture, the chains 38 and 39 separate, the chain 39 being driven upwardly in the direction indicated by the arrow 54 to a sprocket, for example and the chain 38 being drawn to the right in the direction indicated by the arrow 51 to another sprocket, for example. The chains 38 and 39 will then be brought together in interlocking relationship, as will readily be apparent hereinbelow from a description of the transport device illustrated in FIGS. 5 and 6.

Referring now to FIGS. 5 and 6 there is illustrated a transport device attachment for trucks including the drive chain illustrated in FIGS. 3 and 4 and of the type disclosed in the above-identified patent application entitled "Transport Device," Ser. No. 798,366. Generally, the transport device comprises a plurality of support arms 55a, 56a, 57a and 58a pivotally connected at their ends and secured to one edge of the frame 59 of a truck 60 to define one-half a support frame 62. As shown in FIG. 6, the other half of the support frame 62 is defined by a corresponding plurality of pivotally connected support arms 55b, 56b, 57b and 58b secured to the other side of the truck frame 59. Support arms 58a and 58b may have protrusions formed therein for engaging the surface of a truck dock 66 and, accordingly, raising the elevation of the frame 62 to a small extent.

Referring to FIG. 6, the ends of the support arms 55a, 55b; 56a, 56b pivot about a rod 70 enclosing a drive shaft 72 which is terminated at its opposite ends by a worm gear 74 and a sprocket 76. Coupled to the worm gear 74 is a drive shaft 78 which is driven in either direction at a constant angular velocity by a driving member (not shown), such as, for example, a reversible motor or a power takeoff mounted in the truck 60. To achieve improved driving action, the sprocket 76 is coupled via an endless loop chain 80 to a sprocket 82 which, in turn, drives a shaft 84 extending between the opposite ends of the support arms 55a and 55b and the opposite ends of the support arms 58a and 58b.

Defining a common endless loop for a drive chain pair 86, each drive chain comprising interlocking chains 86a and 86b arranged according to the present invention (FIGS. 3 and 4), are a pair of horizontally spaced sprockets 88a and 88b mounted on the drive shaft 72 and a pair of similarly displaced sprockets 90a and 90b mounted on the drive shaft 84.

Spaced laterally to the left of the sprockets 90a and 90b are sprockets 92a and 92b which are mounted on and rotatable about a rod 94 secured at its opposite ends to the other ends of the support arms 58a and 58b. The sprockets 92a and 92b correspond to the sprocket 46 shown in FIG. 3. A pair of sprockets 96a and 96b respectively mounted on elevated rods 98a and 98b direct only the chains 86b upwardly to a pair of sprockets 100a and 100b. The sprockets 96a and 96b correspond to the sprocket 52 shown in FIG. 3. The sprockets 100a and 100b are mounted on rods 102a and 102b respectively which extend inwardly from the support arms 56a and 56b and also define a pivot point between the support arms 56a, 56b and the support arms 57a, 57b, respectively. As shown the sprockets 100a and 100b lie in the same vertical plane with the sprockets 88a and 88b and, accordingly, the chains 86b of the chain pair 86 extend laterally from the sprockets 100a, 100b to the sprockets 88a, 88b.

Finally provided are sprockets 104a, 104b mounted on a pair of elevated rods 106a, 106b which extend from the support arms 58a, 58b, respectively. The sprockets 104a and 104b are laterally displaced from the sprockets 96a, 96b and lie in the same vertical plane therewith. These sprockets engage the chains 86a of the chain pair 86 and direct the chains 86a upwardly to the sprockets 88a and 88b. At the sprockets 88a and 88b, the chains 86a and 86b once again engage in an interlocking relationship.

As best illustrated in FIG. 1, the lateral displacement between the sprockets 96a, 96b which guide the chains 86b upwardly and the sprockets 104a, 104b which guide the chains 86a upwardly is determinative of the required longitudinal extent of a load carrying platform which is conveyed by the drive chain pair 86. Specifically, a platform 110, comprising, for example, a number of transverse members arranged in tongue and groove fashion, includes laterally extending forward and rearward support members 112 and 114 which are received by and secured to the chains 86a and 86b, respectively, of the drive chain pair 86. The distance between the forward and rearward support members 112 and 114 equals the displacement between the sprockets 96a, 96b and the sprockets 104a, 104b. As particularly shown in FIG. 1, this is necessary to make certain that the platform 110 is maintained in a horizontal position as it is carried by the chains 86a, 86b upwardly or downwardly.

In operation, a number of platforms 110 are secured to the chains 86a, 86b of the chain pair 86 such that, at the time a unit load carried by one platform would be deposited onto the truck 60, a unit load of material would be deposited onto a second platform. Specifically, the worm gear 74 is driven in the appropriate direction by the drive shaft 78 to implement the clockwise rotation of the drive shafts 72 and 84, respectively. When the platform 110 is loaded with a unit load of material, the platform transports the load first laterally between the sprockets 96a, 96b and the sprockets 104a, 104b and then upwardly to the sprockets 100a, 100b and 88a, 88b. Thereafter, the platform moves laterally to the right to deposit each unit load of material onto the truck 60. The reverse procedure would take place to implement the unloading of unit loads of material from the truck 60.

In view of the foregoing, it can be seen that by utilizing the unique and novel drive chain of the present invention in the transport device illustrated in FIGS. 5 and 6, there is eliminated the requirement of offset endless chain pairs to convey load carrying platforms between separated locations. Instead of offset endless chain pairs, drive chains including two interlocking chains which move in the same plane and over the same sprockets are provided. Furthermore, unit loads of material heretofore thought too heavy for transportation between vertically spaced locations can now be transported by platforms secured to the interlocking chains of the drive chain of the instant invention. The drive chain provides additional strength in that the flanges of the interlocking chains interact under stress and carry the load from link to link instead of carrying the load from the links to the coupling pins.

While the chain drive of the instant invention has been shown in a transport device heretofore requiring two offset endless loop chain pairs, even greater space and construction savings are made when the instant invention is utilized in an airplane cargo loading transport device of the type described in the above-identified patent application. In the arrangement of the airplane cargo loading transport device disclosed in the above-identified patent application, seven sets of offset chain pairs, together with a plurality of corresponding numbers of sets of offset drive and guide members are required to convey the material from a loading point to the cargo inlet area of the airplane. Through use of applicant's unique drive chain, the number of chain pairs is cut in half, as well as the number of guide and drive members required for the chain pairs.

Although the invention has been described herein with reference to specific embodiments, many modifications and variations therein will readily occur to those skilled in the art. For example, stationary guides may be included in the disclosed drive chain systems to prevent rocks or the like from being picked up by the individual links composing the interlocking chains. Accordingly, all such variations and modifications are included within the intended scope of the invention as defined by the following claims.

I claim:

1. A drive chain comprising at least two chains arranged in superposed interlocking relationship; each chain comprising a succession of links having overlapping portions connected together and having bearing surfaces between the overlapping portions, the overlapping portions of successive links in each chain engaging the bearing surfaces of the links composing the other chain when the two chains are arranged in superposed interlocking relationship.

2. A drive chain according to claim 1 wherein each chain comprises alternately arranged inner and outer links.

3. A drive chain according to claim 2 wherein each link has a substantially arch-shaped configuration and further comprising coupling members for coupling together the overlapping portions of successive links in each chain.

4. A drive chain according to claim 1 wherein each chain comprises a succession of offset links.

5. A drive chain according to claim 4 wherein each link has a generally arch-shaped configuration and wherein the outer overlapping portions of the links in each chain have notches formed therein for engaging the notched outer overlapping portions of the other chain when the chains are arranged in superposed interlocking relationship.

6. A drive chain according to claim 5 further comprising coupling members for coupling together the overlapping portions of successive links in each chain.

7. A chain drive system comprising at least one drive chain, each drive chain comprising at least two chains arranged in superposed interlocking relationship with each chain comprising a succession of links having overlapping portions connected together and having bearing surfaces between the overlapping portions, the overlapping portions of successive links in each chain engaging the bearing surfaces of the links composing the other chain when the two chains are arranged in superposed interlocking relationship.

8. A chain drive system according to claim 7 further comprising sprocket means having a pitch equal to one-half the distance between the overlapping portions of the successive links in each chain for engaging the links of each chain when said chains are arranged in superposed interlocking relationship.

9. A chain drive system according to claim 7 further comprising at least a pair of selectively spaced drive chains for carrying a load therebetween between separated locations.

10. A chain drive system according to claim 9 further comprising at least a pair of sprocket means, each sprocket means having a pitch equal to one-half the distance between the overlapping portions of the successive links in each chain for respectively engaging the links of each chain of said drive chains when said chains are arranged in superposed interlocking relationship.

11. A chain drive system according to claim 10 further comprising load supporting means including a first support member secured to the links of the corresponding chains of the at least two drive chains and a second support member secured to the links of the other corresponding chains of the at least two drive chains.